United States Patent [19]

Iwano et al.

[11] 4,040,834

[45] Aug. 9, 1977

[54] REGENERATION OF PHOTOGRAPHIC PROCESSING SOLUTIONS

[75] Inventors: Haruhiko Iwano; Isao Shimamura, both of Minami-ashigara, Japan

[73] Assignee: Fuji Photo Film Co., Ltd., Minami-ashigara, Japan

[21] Appl. No.: 658,963

[22] Filed: Feb. 18, 1976

[30] Foreign Application Priority Data

Feb. 18, 1975 Japan .................................. 50-20196

[51] Int. Cl.[2] ......................... G03C 5/26; G03C 5/32; B01D 13/00

[52] U.S. Cl. ................................... 96/50 A; 96/60 R; 210/23 H

[58] Field of Search .................. 210/22, 23 H, 321 R; 96/50 A, 50 R, 48 R, 63, 60 R

[56] References Cited

U.S. PATENT DOCUMENTS

| | | | |
|---|---|---|---|
| 3,617,553 | 11/1971 | Nestaway et al. | 210/23 H |
| 3,767,401 | 10/1973 | Newman et al. | 96/60 R |
| 3,923,511 | 12/1975 | Bissonette | 96/60 R |

FOREIGN PATENT DOCUMENTS

| | | | |
|---|---|---|---|
| 709,179 | 5/1954 | United Kingdom | 210/22 |
| 1,260,733 | 1/1972 | United Kingdom | 210/23 H |

OTHER PUBLICATIONS

W & SW-Reference No.-1970, Golomb & Besik, "Reverse Osmosis", pp. R-81-89.

Filtration & Separation, Nov./Dec. 1971, pp. 715-718, 720, R-O "How It Works, What It Costs", by Leightell.

*Primary Examiner*—Mary F. Kelley

*Attorney, Agent, or Firm*—Sughrue, Rothwell, Mion, Zinn and Macpeak

[57] ABSTRACT

Image intensifying solutions containing cobalt (III) complex salts can be regenerated through concentration by means of reverse osmosis.

8 Claims, No Drawings

REGENERATION OF PHOTOGRAPHIC PROCESSING SOLUTIONS

BACKGROUND OF THE INVENTION

1. Field of the Invention

This invention relates to the regeneration of photographic processing solutions for re-use, particularly, to the regeneration of an intensifying solution containing a cobalt (III) complex salt.

2. Description of the Prior Art

The present invention can be applied to the regeneration of an intensifying solution, containing a cobalt (III) complex, which has been brought into contact with image-wise distributed catalytic silver formed by developing an exposed silver halide material in the presence of a developing agent and a coupler so as to obtain a desired level of image density.

According to such a method, one can obtain an image of sufficient density even with a markedly reduced amount of silver halide coated per unit area of photographic material. The solution containing a cobalt complex will be referred to as an intensifying solution. The cobalt complex salt plays the role of an oxidizing agent for the developing agent in contrast to the case of conventional silver halide color photography where silver halide oxidizes the developing agent. Thus, in the above described intensifying processing, the amount of silver halide can be remarkably reduced to such a degree as to just provide a catalytic amount of silver to promote the oxidizing reaction.

A typical embodiment of a photographic processing including such an image intensification is one for photographic color materials with a reduced coated amount of silver halide, whereby the material is processed after image-wise exposure with a color developer to provide image-wise distributed developed silver and also to the imbibe color developing agent sufficiently into the photographic layer, and then is treated with an intensifying solution containing a cobalt complex salt to allow oxidative coupling of the color developing agent, thus providing an image of sufficient density. Development and intensification need not necessarily be carried out by successive treatments; instead, both may be combined in a mono-bath processing.

More specific details of image intensification are described in Japanese patent application No. 76101/74 and in Japanese patent applications (OPI) Nos. 9728/73 and 9729/73.

While photographic processing including image intensification as described permits a reduction of the coating amount of silver halide in photographic materials, a cobalt (III) complex salt must be used as the main component of the intensifying solution. Therefore, it is significant, from the economic point of view, to utilize the cobalt complex as efficiently as possible to minimize the consumption rate thereof.

On the other hand, intensification is typically carried out immediately after development without any intervening washing; thus the intensifying solution is readily contaminated with various ingredients of the developer solution, resulting in a shift of the performance characteristics thereof.

Furthermore, waste containing a cobalt salt should not be discharged out of the system, considering environmental pollution.

SUMMARY OF THE INVENTION

Therefore, present invention has the following objects:

1. To provide an effective method of regenerating a cobalt containing intensifying solution after it has been used.
2. To provide a method of preventing the accumulation of photographically undesirable ingredients brought into the intensifying solution.
3. To remove any adverse effects on the environment with a minimum disposal treatment load for the used intensifying solution, and also to manage a cost reduction of the waste treatment.
4. To establish a method of image intensification which exhibits a minimal fluctuation in processing performance, ensuring a high level of photographic image stability and constant processing conditions.

Among these objects there are included those which can be considered compatible with each other only with difficulty. For example, the first object of repeated use by regeneration will bring about unstability of the processing operation, and thus such is clearly contradictory to the second and fourth objects. Surprisingly, however, the method of the present invention attains all of the above-cited objects simultaneously.

DESCRIPTION OF PREFERRED EMBODIMENTS OF THE INVENTION

The present invention provides a regneration method of a photographic processing solution which is an image intensifying solution comprising a cobalt complex, characterized in that the image intensifying solution containing a cobalt complex salt is concentrated by reverse osmosis after having been used for intensification, and that the concentrated solution, after the necessary correction for consumed components has been carried out (make-up), is available for further processing.

During usage, various contaminants accumulate in the intensifying solution, partly due to the preceding processing agent(s) brought into it, partly due to soluble ingredients in the photographic material processed therewith, and also some chemical species derived from the just mentioned ingredients. Therefore, when such a contaminated intensifying solution is supplied for reuse after regeneration, the influence of the accumulated contaminations must increase with an increased number of regenerations. Unexpectedly, however, in the case of the regeneration method of the present invention, i.e., when the intensifying solution is concentrated by reverse osmosis and then subjected to composition correction, as above described, disadvantages do not take place. Though a theoretical explanation of such advantageous results is not clear at present, presumably unfavorable contaminations are removed through the membrane during reverse osmosis.

Composition correction for the condensed solution is easily accomplished in most cases by adding a small amount of acid to control the pH after dilution with water to a pH of about 4 to about 10, preferably a pH of 9 to 10, and in some cases by further adding a quantity of cobalt (III) complex salt. The intensification capability of the solution can be further raised by aeration, if necessary.

As the intensifying solution need not be thrown away after use by these operations, the environment is not polluted and disposal costs are avoided.

Moreover, the performance of the thus regenerated intensifying solution is quite stable, giving photographic images of constant quality. With respect to performance stability, the system based on regeneration according to the present invention has proved superior to one based on replenishment with fresh intensifying solution, showing less fluctuations in image quality. In a replenishment system which comprises processing photographic materials with an intensifying solution while the used solution is over flown and passed to waste, and simultaneously fresh replenishing solution is added, constant image qualities can not be obtained because the concentrations of the components in the intensifying solution are not kept constant due to each replenishment and due to the passage of time. The method of this invention however, does not suffer from these disadvantages.

Reverse osmosis has recently been utilized for the concentration of aqueous solutions, having the following advantageous features;

1. Automated, high efficiency concentration is possible with little manpower.
2. It is suited for the concentration of rather dilute solutions such as rinse water after fixing.
3. The transmitted water can be reused, making heat efficiency high.

Thus, application to the treatment of photographic processing waste solution has been investigated, resulting in a number of research reports being published, including the following;

I. M. Key, F. J. Quinn, M. W. Marshall, & H. Meike, J. SMPTE 81, 461 - 464 (1972)

II. Photographic Processing 5 p. 14 - 16 (May, 1970)

III. L. E. West Phot Marketing, July, 1970 p. 20 - 22 and 30

IV. L. E. West, J. SMPTE September 1970

However, the problem of disposing of the concentrated liquids from such processing has not been solved, and thus reverse osmosis technology has not yet been put to practical use.

It should be noted that in the present invention the function of reverse osmosis is somewhat different from its intrinsic function. The used intensifying solution to be subjected to reverse osmosis and the replenishing solution for the intensifying bath (which is obtained by reverse osmosis) are only about 10 to about 20 wt.% different in concentration, therefore, it is clear that in the present invention reverse osmosis is employed for a purpose different than conventional purposes of reverse osmosis, for example, concentration or the regeneration of rinse water. Since the concentration by reverse osmosis in the present invention chiefly aims to maintain the characteristics of the regenerated solution constant, the concentrated solution is usually again diluted prior to recycle.

Typically, the used intensifying solution is forwarded to (overflown) into a regenerating task when the amount of Co (III) complex in the intensifying bath is reduced to about 95 to about 80 wt% of its original value.

The present invention can utilize any type of reverse osmosis apparatus provided with membrane modules, with preferred membrane materials being cellulose acetate (particularly cellulose diacetate), hollow fibers of a high molecular weight polyamide (e.g., nylon), tubular modules or rod modules thereof, etc. Commercially available products are, for example, "Permulo I" of Shinko-Fowdler Co., "Kurita-Adjacs" of Kurita Ind. Co., "Osmo 70030", "Osmo 210030" and "Osmo 700030" of Osmonics, Inc. (Minn. U.S.A.), "Abcor RO 38" and "Abco RO 42" of Bioengineering Co., and still other reverse osmosis apparatus marketed by Tosho-Colligan Co., Orugano Firm. etc.

Such reverse osmosis apparatus is operated at a specified maximum pressure which usually lies between about 28 and about 100 kg/cm$^2$ guage, hereafter the same, and the temperature is usually 0° to 70° C, preferably 0° to 45° C. The time for processing is not limited, and the reverse osmosis is conducted against water. The pH during reverse osmosis is typically about 8 to about 10, preferably about 9, for the intensifying solution regenerating.

While for a hollow tubular type apparatus the maximum pressure is set up at about 28 kg/cm$^2$, one of the membrane module type has a higher resistance to pressure, e.g., up to about 42 kg/cm$^2$ due to its construction. Some models of tubular type apparatus are already in practical use which have a maximum pressure as high as 100 kg/cm$^2$.

To realize the objects of the present invention, any type of membrane can be used, but a cellulose acetate membrane is particularly suitable. The degree of concentration by reverse osmosis can be varied widely, usually ranging from a factor of 1 to about 30, particularly from 1.2 to 10, i.e., Concentration before regeneration/Concentration directly after regeneration. A pressure not exceeding 60 kg/cm$^2$ and more particularly from 10 to 45 kg/cm$^2$ most preferably being used.

Though the principal object of the present invention is for the re-use of intensifying solutions, the reverse osmosis process of the present invention is also applicable to intensifying developers by adding an intensifying agent to a color developer. It can also be applied to cobalt blix (bleach-fixing) solutions in which a cobalt complex salt is used as bleaching agent.

The intensifying solution of this invention comprises water plus a cobalt (III) complex in its simplest form. Generally, it further contains an alkali agent (e.g., sodium hydroxide, potassium hydroxide, sodium carbonate, potassium carbonate, etc.), and preferably it contains such an alkali agent plus a bromide (e.g., potassium bromide, ammonium bromide, sodium bromide, etc.). Thus, the intensifying solution to which the method of the present invention is applied can contain, in addition to water plus a cobalt (III) complex salt, various additives such as acids, such as phosphoric acid, boric acid, nitric acid, sulfuric acid, acetic acid, citric acid, etc., alkalis such as sodium hydroxide, potassium hydroxide, sodium carbonate, potassium carbonate, etc., or salt such as sodium phosphate ($Na_3PO_4$), potassium phosphate ($K_3PO_4$), potassium metaphosphate, borax, sodium bicarbonate, potassium bicarbonate, etc., to control pH or impart a buffer activity thereto. It can also contain an alkali halide such as KBr, or an ammonium halide such as ammonium bromide, ammonium chloride, ammonium iodide, an organic antifoggant such as 6-nitrobenzimidazole, a heavy metal scavenger such as ethylenediamine tetraacetic acid or its salts, etc.

Thus, in one typical embodiment a fresh intensifying solution will contain a Co (III) complex plus an alkali agent as a pH buffer (usually sodium carbonate to provide a pH of 9 - 10) plus, if desired, a bromide (usually, potassium bromide). After use, such an intensifying solution would typically comprise all components in the original intensifying solution, a Co (II) complex, a ligand, the oxidation product of the developing agent and various compounds (e.g., an antifoggant, surface active agent, etc.) dissolved out from the processed photographic layer(s), the Co (II) complex being formed from a part of the Co (III) complex and the ligand being released from the Co (II) complex.

After regeneration, the intensifying solution would contain all components of the initial intensifying solution including the Co (III) complex and Co (II) ions. Halides (e.g., Cl, Br, etc. if present) and many ligands (e.g., ammine, amine, etc.), the oxidation product of developing agent and some compounds (e.g., organic compounds such as antifoggants) dissolved out from the processed photographic layer(s) are removed by the regeneration (i.e., the reverse osmosis).

Since the regenerated intensifying solution contains a Co (III) complex and Co (II) ions, an amount of the Co (III) complex equivalent to (or at most about 20 wt% more than) the amount of the Co (III) complex converted to Co (II) ions can be replenished (made-up) before the regenerated solution is recycled. Often about a 10 to about 20 wt% difference is found in the concentration of the Co (III) complex before and after regeneration so that the amount of Co (III) complex added to the regenerated (concentrated) solution is about 10 to about 20 wt% of the Co (II) and Co (III) complex in the used solution subjected to regeneration (per unit volume).

The ratio of the used intensifying solution subjected to the regeneration step to the original bath (not regenerated which remains in the tank) is not important. It is important, however, that the volume of the used intensifying solution subjected to the regeneration step be about 50 to about 800 cc per $m^2$ of photographic materials to be processed for best results.

The volume ratio of the recycled regenerated intensifying solution to the used intensifying solution subjected to the regeneration step is 1 to about 30, i.e., the regenerated solution is diluted with water, so that the volume of the diluted solution is the same as that of the used one subjected to the regenerations step, because an aqueous solution containing only contaminates is removed by reverse osmosis.

The cobalt complex of the present invention are those which are rather inert (the definition of "inert" is disclosed in "J. Am. Chem. Soc." 73, 4789 (1951)) i.e., which have a slow ligand exchange rate and contain a trivalent cobalt (cobaltic) ion.

Various ligands for the cobaltic ion can be used to form suitable complexes. Almost any Lewis base (i.e., compounds having an unshared electron pair) can be used. Typically, examples of useful ligands include those described in "Mechanisms of Inorganic Reactions, A Study of Metal Complexes and Solutions" 2nd ed. authored by Basolo and Pearson, published by John Wiley and Sons (1967) at page 141, and, further, halides such as chlorides, bromides and fluorides, nitrites, $H_2O$, ammine, amines etc.

The unstability of a ligand in a complex depends on the nature of the ligand selected to form the complex.

Particularly useful cobalt complexes have a coordination number of six and comprise a ligand selected from the group ethylenediamine (en), diethylenetriamine (dien), triethylenetetramine (trien), ammine ($NH_3$), nitrate, nitrite, azide, chloride, thiocyanate, iso-thiocyanate, $H_2O$, carbonate and ethylenediamine tetraacetic acid (EDTA). Preferred cobalt complexes contain at least one ammine or amine as a ligand, with more preferred Co (III) complexes containing: (i) at least two ethylenediamine ligands and preferably 3 of such ligands; or (ii) at least five ammine ligands and preferably six of such ligands; (iii) one triethylenetetramine ligand. Particularly useful cobalt complexes are cobalt hexaammine complex salts (which salts are, for example, chloride, bromide, sulfite, sulfate, perchlorate, nitrite and acetate; these salts are counteranions for the complex). Other extremely useful complexes include those represented by the following general formulae: $[Co(NH_3)_5H_2O]$ X; $[Co(NH_3)_5CO_3]$ X; $[Co(NH_3)_5Cl]$ X; $[Co(NH_3)_4CO_3]$ X; cis-$[Co\ (en)_2(NO_3)_2]$ X; trans-$[Co\ (en)_2Cl(NCS)]$ X; trans-$[Co\ (en)_2(NO_2)_2]$ X; cis-$[Co\ (en)_2(NH_3)(NO_3)]$ X; cis-$[Co\ (en)_2Cl_2]$ X; trans-$[Co\ (en)_2Cl_2]$ X; $[Co\ (en)_2(SCN)_2]$ X; and $[Co\ (en)_2(NCS)_2]$ X; in the formulae X represents one or more anions, typically 1 to 3 anions. The number of the anions is determined by the charge neutralization rule.

In the above-described complex, anions which are not co-ordinated can decompose the complex to a sufficient degree. Various anions impart higher stabilities to a cobalt hexammine complex in the following order: bromide, chloride, nitrite, perchlorate, acetate, carbonate, sulfite, and sulfate. Other anions will also promote decomposition of a complex. Other useful ions include hydrochloride, nitrate, thiocyanate, dithionate and hydroxide. Though positively charged complexes are suitable in general, neutral complexes such as $[Co(dien)(SCN)_2OH.]$ can also be used.

The concentration of a cobalt complex can be arbitrarily adjusted within the solubility range thereof, usually falling between about 2 and about 15 g/l.

As will be appreciated by one skilled in the art from the heretofore offered discussion, the image intensifying solutions of the present invention can be used to process conventional silver halide materials, for example as described in U.S. Pat. No. 3,765,891 which discloses generally used silver halide color photographic materials amenable to processing in accordance with the invention.

In the color development preceeding intensification, any known color developing agent can be used, conventionally in an amount of 0.1 - 1 wt%. The developing agent for such a color developer is typically a p-phenylene diamine derivative. Typical derivatives include N, N-diethyl-p-phenylene diamine hydrochloride, 2-amino-5-diethylaminotoluene hydrochloride, 2-amino-5-(N-ethyl-N-laurylamino) toluene, 4-[ethyl-N-(β-hydroxyethyl)amino] aniline sulfuric acid salt, 2-methyl-4-[N-ethyl-N-(β-hydroxyethyl)anino] aniline sulfuric acid salt, N-ethyl-N-(β-methanesulfoamidoethyl)-3-methyl-4-aminoaniline sesquisulfate monohydrate which is described in U.S. Pat. No. 2,193,015, N-(2-amino-5-diethylaminophenylethyl) methanesulfonamide sulfuric acid salt which is disclosed in U.S. Pat. No. 2,592,364, N,N-dimethyl-p-phenylendiamine hydrochloride, and other aminophenols such as p-aminophenol sulfate, N-methly-p-aminophenol hemisulfate, N-benzyl-p-aminophenol chloride, N, N-diethyl-p-aminophenol chloride, etc. Detailed descriptions on these color developing agents are found at p. 72 of "Kagaku Shashin Binran" (Scientific Encyclopedia of Photography) Vol. 2, published by Maruzen Publishing Co. in 1959 and in p. 226 - 229 of "Photographic Processing Chemistry" published by Focal Press, London in 1966.

In the case where such a developing agent is used, the image forming material or the developing solution must contain a coupler such as is described in p. 387 - 392 of "The Theory of Photographic Processes" 3rd ed., authored by Mees and James.

p-Aminophenol derivatives can also be used as reducing agents in which case image formation is carried also out in the presence of such a similar coupler.

The developer can contain, in addition to one or more of the developing agents as mentioned above, an auxiliary developing agent such as 1-phenyl-3-pyrazolidone.

The developer can further contain other known ingredients for developers, e.g., an alkaline agent or buffering agent such as sodium hydroxide, potassium hydroxide, sodium carbonate, potassium carbonate, sodium or potassium phosphate ($Na_3PO_4$, $K_3PO_4$) potassium metaphosphate, borax, etc., solely or in combination. Also for the purpose of buffering, for convenience in preparation of the developer, or in order to raise the ionic strength, one can add mono-sodium or potassium phosphate, di-sodium or potassium phosphate, sodium or potassium bicarbonate, boric acid, alkali nitrates, alkali sulfates and various other salts.

A suitable amount of anti-foggant can be incorporated in the developer solution. Typical examples include alkali bromides such as sodium bromide, potassium bromide, or ammonium bromide, other inorganic halides such as potassium iodide or sodium iodide, and organic anti-foggants as are well known in the art, e.g., 6-nitrobenzimidazole.

As a special embodiment to which the present invention can be applied, one can mention an intensifying developer which contains the ingredients for an intensifying solution as described above and those for a color developer as described above. In such a case, the pH of the intensifying developer should desirably be not higher than about 10.5, and in some cases the pH is lowered, prior to the reverse osmosis concentration, e.g., to a value not higher than pH 10.5, often pH 8 to 10.

In one embodiment of the present invention the intensifying solution is supplied from an intensifying solution tank in a developing apparatus and lead to a small-sized reverse osmosis apparatus, subjected to reverse osmosis and the concentrated solution sent back to the tank so that the total volume of the regenerated (or concentrated) solution and supplemented water is the same as the volume of the intensifying solution supplied from the tank to the regeneration step, i.e., the volume of the supplemented water is the same as that removed by reverse osmosis.

Having thus generally described the invention, the following Examples are given to illustrate the same in detail.

EXAMPLE 1

A color photographic paper was manufactured by coating on a baryta paper the following layers in the following order: a silver bromide-gelatin emulsion layer containing an emulsified yellow coupler (AgBr/gelatin = 13/100 by weight, thickness = 4.5 microns); a silver chlorobromide-gelatin emulsion layer containing an emulsified magenta coupler (AgCl content = 70 mole %, AgX/gelatin = 13/100 in weight, thickness = 4.5 microns); a silver chlorobromide-gelatin emulsion layer containing an emulsified cyan coupler (AgCl content-70 mole %, AgX/gelatin = 13/100, thickness—4.5 microns); and a gelatin layer containing an ultraviolet light absorber, "Tinuvin," at a coating amount of 100 mg/m² for Tinuvin (Tinuvin/gelatin-1/2 in weight, thickness = 2 microns). Each coupler emulsion used for the manufacture of this color paper had been prepared by first dissolving 1 part by weight of the coupler into a mixture comprising 1 part by weight of dibutyl phthalate and 1 part by weight of tricresyl phosphate, and dispersing one part by weight of the resulting coupler solution into an aqueous gelatin solution containing the same weight of gelatin as that of the coupler solution with the aid of a dispersing agent comprising sorbitan monolaurate, Turkey red oil and sodium dodecylbenzene sulfonate (2 wt% of the mixture, respectively) to form an O/W type emulsion.

The couplers employed were 1-(2',4',6'-trichlorophenyl)-3-[3'(2",4"-di-t-amylphenoxyacetamide)benzamide]-5-pyrazolone (magenta), 1-(hydroxy)-4-chloro-2-n-dodecylnaphthamide(cyan), and α-(2-methylbenzoyl)-aceto-(2'-chloro-5'-dodecoxy-carbonyl)-anilide(yellow). The ultraviolet light absorbing agent used was the one disclosed in Japanese patent publication No. 9586/70. Also 2,4-dichloro-6-hydroxy-1,3,5-triazine sodium salt was incorporated in each emulsion in amount of 1 weight % of the gelatin.

The coating amounts for the couplers and the silver halides in this color paper were as follows.

| | Coating Weight | |
|---|---|---|
| | Coupler | Silver halide |
| Red sensitive layer | 0.4 g/m² | 0.02 g Ag/m² |
| Green sensitive layer | 0.5 " | 0.02 " |
| Blue sensitive layer | 0.4 " | 0.02 " |

A sample sheet of the color paper was exposed at an intensity of 100 CMS by means of a tungsten lamp of a 3200° K color temperature, developed for 1.5 min. at 30° C, and, after immersion in the following intensifying solution for 3 min., subjected to blixing with a Fe EDTA-thiosulfate blix solution for 3 min. at 30° C as described below.

| Developer Composition | |
|---|---|
| 4-diethylamino-2-methylaniline sulfate | 2.5 g |
| sodium sulfite | 2.5 g |
| potassium bromide | 0.2 g |
| sodium carbonate | 30 g |
| sodium hydroxide | 0.2 g |
| water | to make 1 liter |
| **Composition of Intensifying Solution** | |
| hexa-ammine cobalt chloride | 5 g |
| potassium bromide | 1 g |
| sodium carbonate monohydrate | 1 g |
| water | to make 1 liter |
| **Composition of Blix Solution** | |
| Fe (III)-ethylenediamine tetraacetate | 17.25 g |
| ammonium thiosulfate (70% aq.sol.) | 100 ml |
| water | to make 1 liter |

The overflowing volume of the intensifying solution was collected and passed through a tubular type reverse osmosis apparatus (Kurita-Adjacs) provided with cellulose acetate membranes at 15 kg/cm² and 30° C until the liquid volume was reduced to the half of the initial volume. Water then was added to the thus concentrated liquid to bring the volume thereof back to the original volume. When the pH of the concentrated liquid during reverse osmosis exceeded 9.5, hydrochloric acid was added to maintain the pH at 9.5.

By such a method, one could carry out five-round processing, i.e., the used intensifying solution could be regenerated 5 times more than the volume of the intensifying solution tank, without exhausting the cobalt containing intensifying solution and while maintaining stable photographic performance for the resulting image quality. This means that the processing capability accomplished was equivalent to that for a tank volume replenished with a replenishing solution five times as much as the volume of said tank.

EXAMPLE 2

Similarly satisfactory results were obtained as in Example 1 when the factor of concentration for reverse osmosis was raised to 7 in place of 2 in the first example.

While the invention has been described in detail and with reference to specific embodiments thereof, it will be apparent to one skilled in the art that various changes and modifications can be made therein without departing from the spirit and scope thereof.

What is claimed is:

1. In photographic processing involving image intensification of a photographic element comprising a substrate and at least one layer containing image-wise distributed silver in the presence of a reducing agent by application of a cobalt (III) complex having ligands selected from the group consisting of ammine, nitrite, nitrate, azide, chloride, thiocyanate, isocyanate and $H_2O$; a method for reusing the intensifier solution containing the cobalt (III) complex characterized by:

subjecting used intensifying solution to reverse osmosis whereby the cobalt (III) complex is concentrated and unfavorable contaminants are removed, and adjusting the pH to about 4 to 10, said solution thereby being regenerated for further intensifying.

2. The process of claim 1 wherein additional cobalt (III) complex is added to the solution prior to further intensifying.

3. The process of claim 1 wherein said solution is aerated prior to further intensifying.

4. The process of claim 1, wherein said reducing agent is a developing agent.

5. The process of claim 1, wherein said Co (III) complex is composed of Co (III) having a co-ordination number of six, and at least one ammine ligand.

6. The process of claim 1, wherein said cobalt (III) complex is composed of Co (III) having a co-ordination number of six and at least five ammine ligands.

7. The process of claim 1, wherein the concentration of said Co (III) complex is about 1 to about 15 g/l.

8. The process of claim 1, wherein water is added to the regenerated intensifying solution to make the volume equal to the original volume.

* * * * *